United States Patent [19]
Kopp

[11] Patent Number: 5,399,180
[45] Date of Patent: Mar. 21, 1995

[54] MODULAR FILTER ASSEMBLY

[76] Inventor: John G. Kopp, 2006 Via Vina, San Clemente, Calif. 92673

[21] Appl. No.: 163,269

[22] Filed: Dec. 6, 1993

[51] Int. Cl.⁶ .............................................. B01D 29/05
[52] U.S. Cl. ........................................ 55/493; 55/495; 55/506; 55/507; 55/519; 55/DIG. 31; 210/445; 210/453
[58] Field of Search ................. 55/493, 495, 503, 506, 55/507, 519, DIG. 31; 210/445, 451, 453

[56] References Cited

U.S. PATENT DOCUMENTS

| | | | |
|---|---|---|---|
| 3,306,069 | 2/1967 | Wegman | 62/262 |
| 3,494,113 | 2/1970 | Kinney | 55/493 |
| 3,568,416 | 3/1971 | Staunton | 55/486 |
| 3,630,008 | 12/1971 | Reuell et al. | 55/493 |
| 3,778,985 | 12/1973 | Daigle et al. | 55/493 |
| 3,993,464 | 11/1976 | Pelabon | 55/493 |
| 4,002,443 | 1/1977 | Lorenz | 55/493 |
| 4,124,362 | 11/1978 | Westlin et al. | 55/DIG. 31 |
| 4,133,653 | 1/1979 | Soltis . | |
| 4,174,205 | 11/1979 | Koushiafes | 55/354 |
| 4,472,184 | 9/1984 | Neumann et al. | 55/493 |
| 4,512,891 | 4/1985 | Wright et al. | 210/445 |
| 4,701,196 | 10/1987 | Delany | 55/481 |
| 4,978,375 | 12/1990 | Il Yoo | 55/493 |
| 5,236,478 | 8/1993 | Lewis et al. | 55/495 |
| 5,273,564 | 12/1993 | Hill | 55/493 |

FOREIGN PATENT DOCUMENTS 1302878  1/1973  United Kingdom .

*Primary Examiner*—Robert A. Dawson
*Assistant Examiner*—W. L. Walker
*Attorney, Agent, or Firm*—Macro-Search Corp.

[57] ABSTRACT

A combination filter module unit and replaceable filter element is disclosed, for use with an air handling system. The filter module unit provides channel construction for guiding the filter element between support legs. An access door provides a forth side to the rectangular unit. The filter element is of the typical flat rectangular construction type and includes a support frame for holding a filter media, the filter element frame being adapted to tightly fit within the outer frame so that air cannot flow around the filter element. A handle is used to insert and extract the filter element and provides a second function of providing a wedging surface for the access door to ride upon in achieving wedging action against the filter element so that the element is locked securely in place. The module provides double wall construction to enable fasteners to be place away from the filter element to avoid interference with it and to achieve a clean appearance.

6 Claims, 4 Drawing Sheets

MODULAR FILTER ASSEMBLY

FIELD OF THE INVENTION

The invention relates generally to air filter assemblies and specifically to improved filter support devices of simple construction and easy use.

BACKGROUND

In the early part of this century room air chilling was unknown and heating was limited to direct radiant types from sources of burning matter, such as a stove or fireplace. Large facilities such as factories and apartment buildings were efficiently heated by steam or hot water systems. It was not until the development of the high efficiency heat exchanger that hot air systems came into widespread use driven by the great demand for air chilling equipment. Because air chilling requires air displacement, it has made economical sense to use air heating as well as chilling in a common system, i.e., a system which recycles the air within the enclosed environment. A significant advantage to the moving of air is that it can be constantly filtered thereby maintaining a clean air inventory. Air cleaning technology has brought the advantages of low dust count levels, low pollen levels, and is responsible for low airborne pathogen levels in living spaces as well.

British 1,302,878, Staunton, U.S. Pat. No. 3,568,416, and Wright et al., U.S. Pat. No. 4,512,891 all teach various framed or otherwise supported filter media units for use in air handling systems. Flat filter media elements at very low prices are provided to a mass market of hundreds of millions of units per year. Wegrnan, U.S. Pat. No. 3,306,069 teaches a front assembly for a room air conditioning unit including placement of filter media. Il Yoo, U.S. Pat. No. 4,978,375 shows an effective means for supporting a filter media during use without the need for an external frame or grid structure.

Mass usage of filter elements, has driven a need for simplified installation and replacement of these units. Frequently air handling units made of sheet metal and designed in the absolutely least expensive way tend to be poorly designed for ease of filter replacement. Filters, in such equipments are also held poorly so that air flow around the element is more likely. Koushiafes, U.S. Pat. No. 4,174,205 teaches an improved filter media unit having a replenishable supply of media. This, of course, could result in an improved heating efficiency through the improved maintenance of high air flow by more frequent change of filter media. Delany, U.S. Pat. No. 4,701,196 teaches a draw style filter unit to be inserted into a box which is made part of a fumace system structure. Soltis, U.S. Pat. No. 4,133,653 describes a residential type filter assembly including a housing, prefilter, collector, ionizer, and a unique mode of suspending an ionizing wire within the assembly. The latter is similar to the instant invention.

The prior art does not address directly the problem of providing a highly simplified filter installation coupled with assurance of a tight fitting installation in a inexpensive assembly. These three requirements tend to be mutually exclusive in the art and in the commercially available solutions today. The instant invention provides an elegant solution which is at once unique and yet highly practical in the commercial sense.

SUMMARY OF THE INVENTION AND OBJECTIVES

The instant invention provides an inexpensive and novel solution to the problem of easy replacement of the filter elements of air handling units such as in residential type furnaces and air conditioners. Additionally, a solution is provided to the problem of a need for a low cost means for assuring that each the filter element is well fitted into place so that blow-by does not occur. Finally, a solution is provided to the problem of requiting a modular add-on unit for use with existing, as well as new, air handling equipment. The solution includes means for fast and effective mounting of the instant invention to such air handling equipment with fasteners which are displaced from the location of the filter element so that the fasteners cannot interference with filter movements.

The instant invention is a combination of a filter module unit and a replaceable filter element for an air handling system. The filter module trait provides channel construction for guiding the filter element between support legs. An access door provides a forth side to the rectangular unit. The filter element is of the typical flat rectangular type and includes a support frame for holding a filter media, the filter element frame being adapted to tightly fit within the outer frame so that air cannot flow around the filter element.

One surface of the filter element lays in contact with the frame and also a support shelf extending between the legs. This construction provides an open window for exposing the filter media to the directed air stream. An ingenious yet simple handle is provided for inserting the filter element and for guiding the access door into contact with one edge of the filter element. The access door is provided with a positive locking means so that the filter element cannot work itself loose over time.

The side walls of the end rails each are constructed with a double wall. This provides added strength and also a space for inserting fasteners to attach the module to the air handling system with which it is to work cooperatively.

Other features and advantages of the present invention will become apparent from the following more detailed description, taken in conjunction with the accompanying drawings, which illustrate, by way of example, the principles of the invention.

DESCRIPTION OF THE DRAWING FIGURES

The accompanying drawings illustrate the invention. In such drawings.

DETAILED DESCRIPTION OF THE PREFERRED EMBODIMENT

Figure 1:
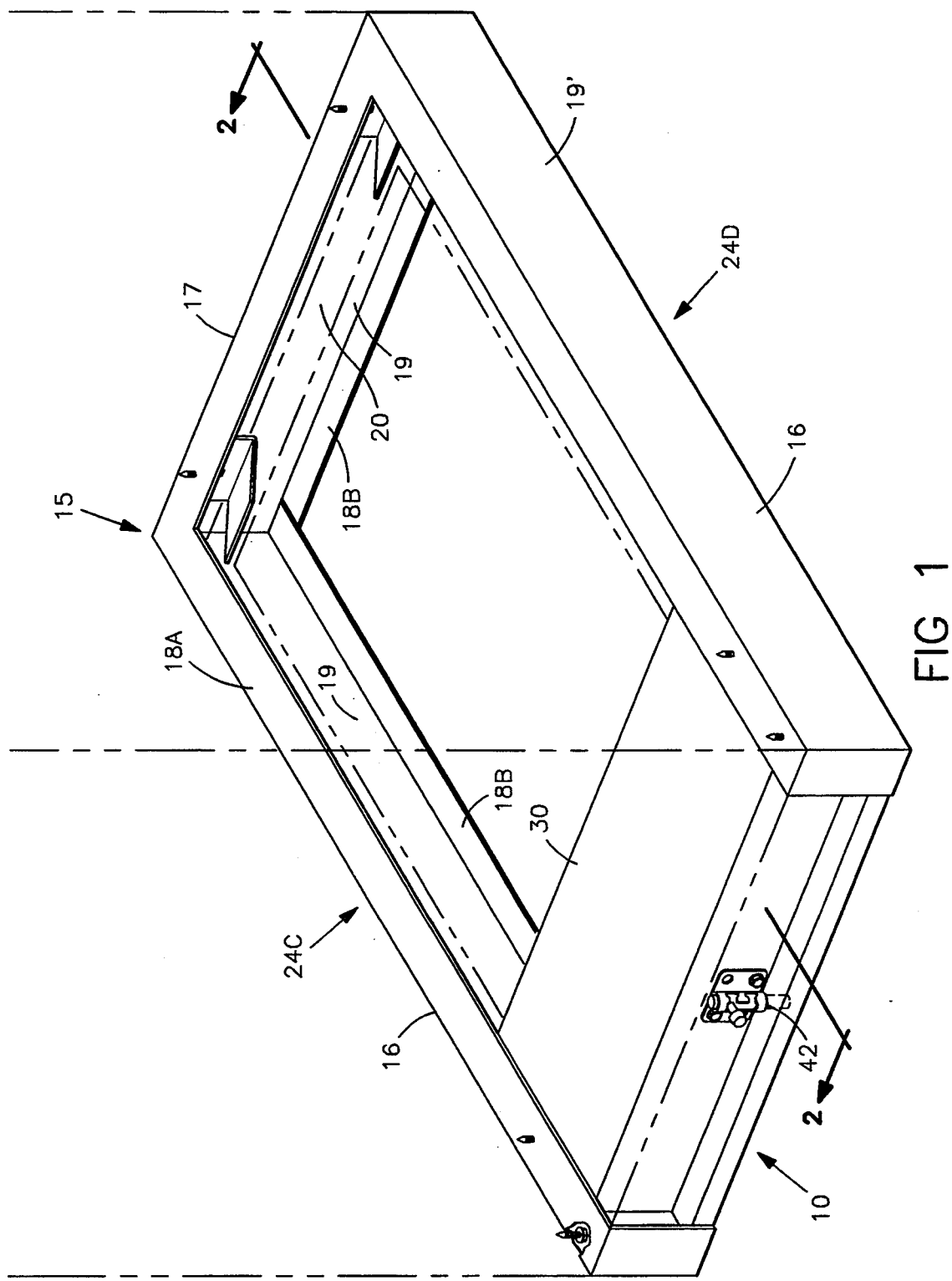
FIG. 1 is an isometric view with the filter element of the invention being shown in broken line.

FIG. 1 illustrates a combination filter module unit 10 and a replaceable filter element 20 for use with a typical air handling system such as for a residential type furnace or an air conditioner. The filter module unit 10 is constructed as a three sided U-shaped outer frame 15. The sides or legs of this frame 15 are of channel type construction for slidably accepting the filter element 20 within the frame 15. A removable access door 30 is adapted for positive engagement with the frame 15 and forms a forth side on the frame 15 to enclose and capture the filter element 20 within the frame 15.

The filter element 20 is of the typical flat rectangular construction including a filter element frame 21 supporting in peripheral engagement, a filter media 22 typically of pleated fibrous material. The filter element frame 21 is of a width to tightly fit within the outer frame 15 in such manner as to prevent a directed air stream forced through the filter media 20, from diverting around the filter element frame 21 which would result in blow-by.

The outer frame 15 comprises a pair of parallel guide legs 16 interconnected at one end of the legs 16, by a base leg 17. Each of the legs 16, 17 are constructed as three sided in cross section as is clearly shown in FIG. 1. Each leg 16, 17 has opposing guide rail sides 18A, 18B, formed integrally with an end rail side 19. The filter element 20 has a mounting surface 22 disposed between four element side edges 4A, 24B, 24C, and 24D, the side edges defining a rectangular peripheral extent of the filter element 20, the mounting surface 22 being adapted as a flat surface for contact with coplanar guide rails 18B on three sides.

Two opposing, 24C and 24D of the four side edges 24A–B of the filter element 20 are adapted, due to the dimension between them, for close fitting adjacent to the corresponding end rail side 19. The filter element 20 is guided during insertion and extraction, between the end rail sides 19 into place adjacent the base leg 17.

The pair of parallel guide legs 16 are joined, adjacent to the access door 30 by a support shelf 40 extending between the pair of guide legs 16 and providing, along with the guide rail sides 18B an open window 50 for exposing the filter media 22 to the directed air stream.

Figure 2:
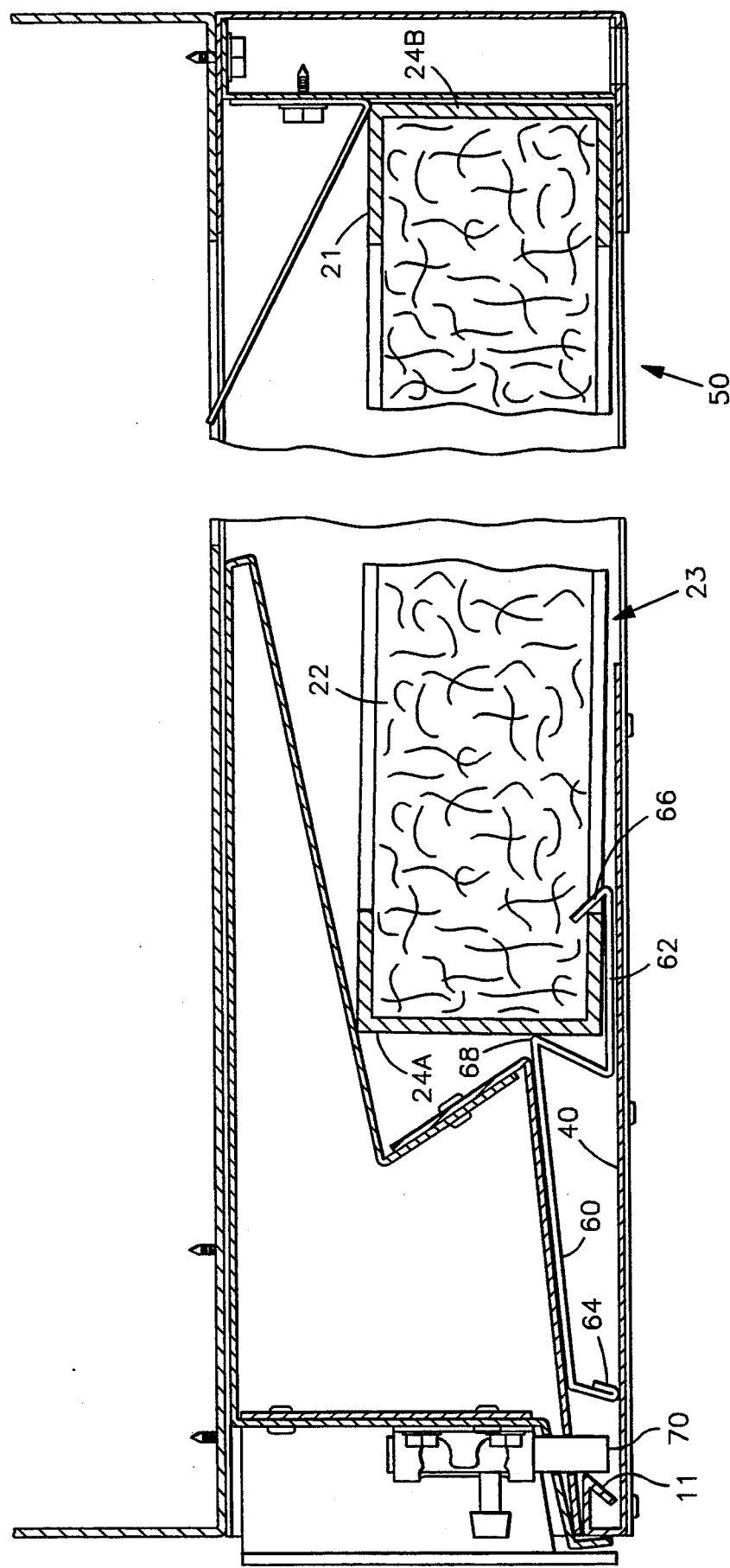
FIG. 2 is a cross section taken along lines 2—2 showing the assembly during typical operation.
Figure 3:
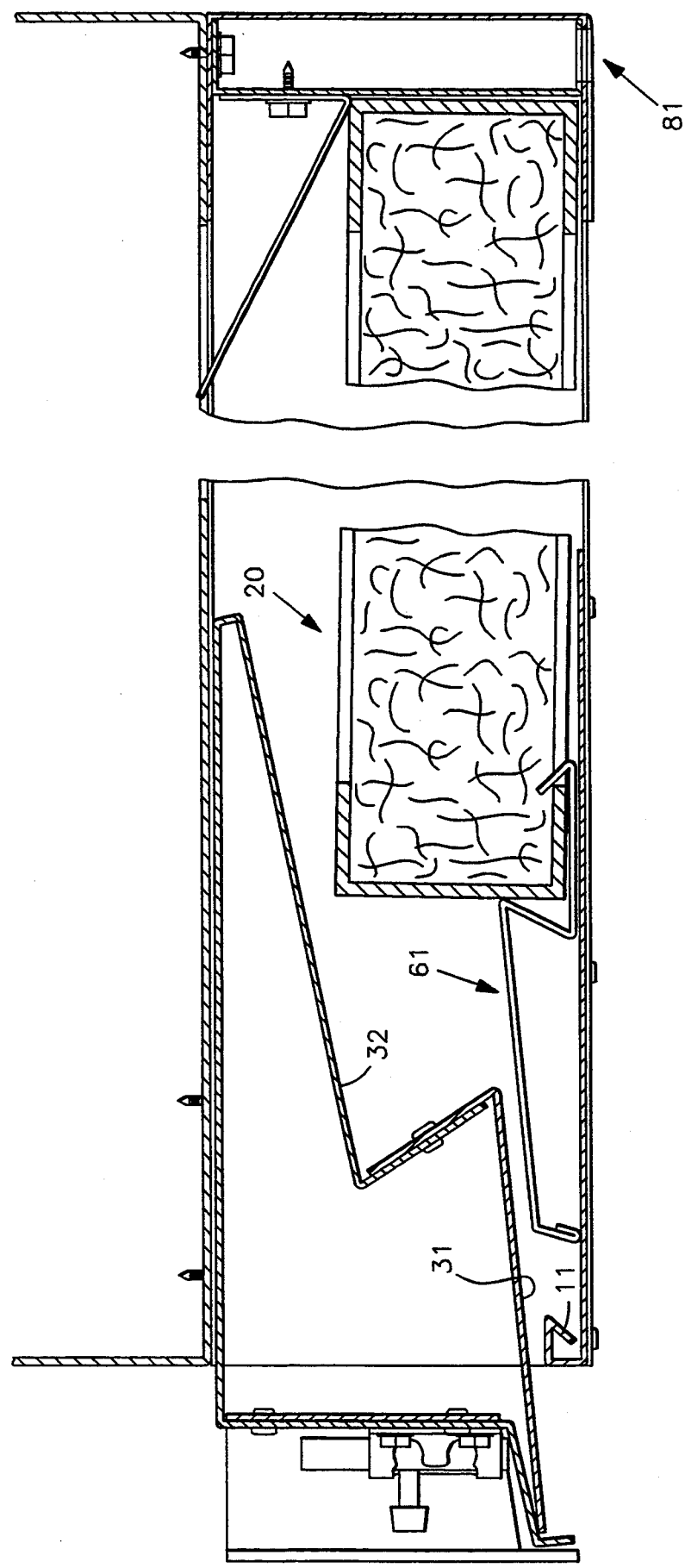
FIG. 3 is a cross section taken along the same lines as FIG. 2 but showing the access door of the invention in the process of being removed, or alternately inserted.
Figure 4:
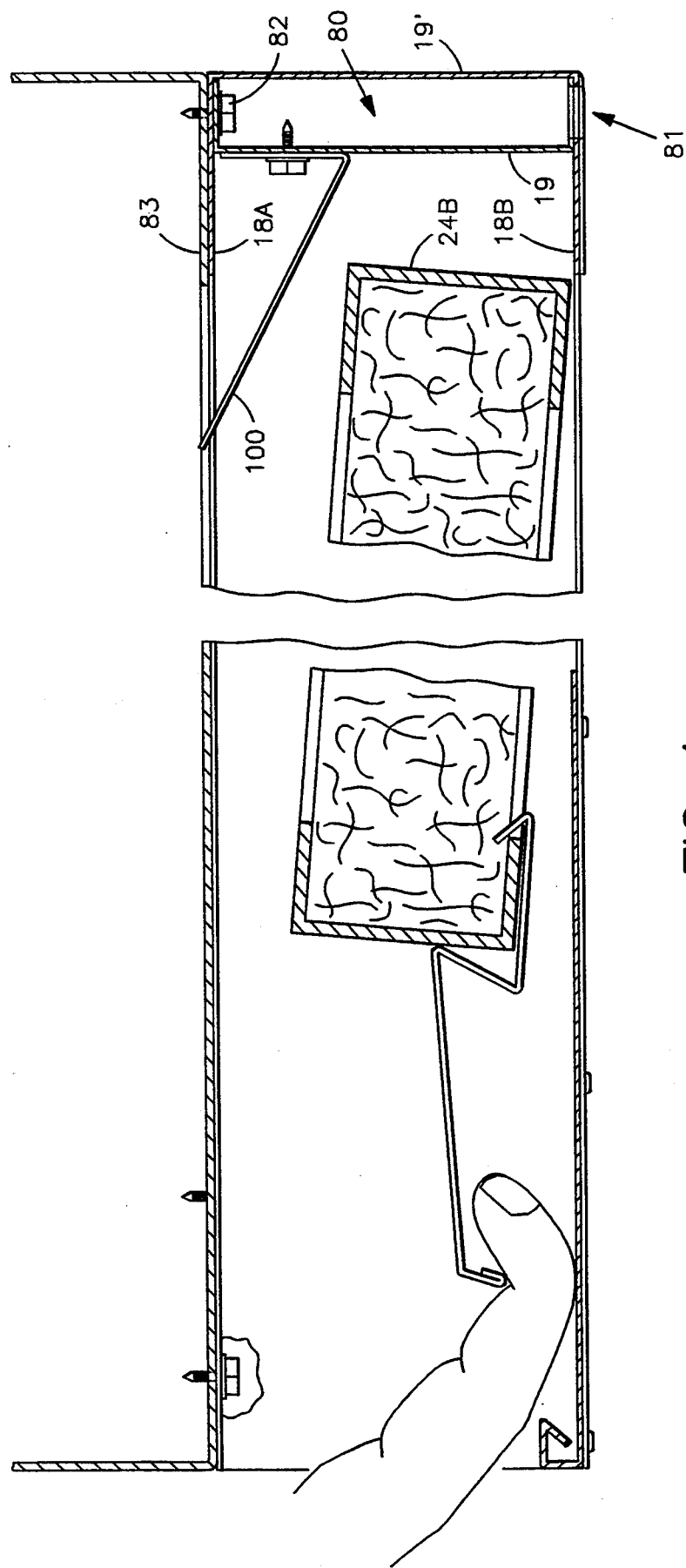
FIG. 4 is a cross section taken along the stone lines as FIG. 2 but showing the filter element of the invention in the process of being removed, or alternately inserted.

As best illustrated in FIGS. 2–4, a filter element handle 60 provides a means for engaging 62 of the handle 60 with the filter element 20 for inserting and for withdrawing the element from the outer frame 15. This means includes a hook 66 adapted to slide between the filter frame 21 and the filter media 22, and an abutment 68 adapted for pressing the frame 21 onto the hook 66. The handle 60 is easily removed from the filter frame 21 by rotating the handle 60 such that the hook may be slid out of contact with the frame 21. The handle 60 further includes a grasping means 64 for holding the handle between the fingers of a hand in order to more easily move the filter into or out of the module. The handle 60 preferably extends from the filter element 20 toward the access door 30 and includes a sloping surface 61 corresponding with a first sloping surface 31 of the access door 30 such that the two surfaces are slidably engaged when the access door 30 is inserted into the module 10 for pressing against the filter element 20 in wedged engagement therewith to ensure that the filter element 20 is fully engaged within the filter module unit 10.

As shown in FIGS. 1–4, the filter module unit 10 and the access door 30 have first 11 and second 31 mutually cooperative locking engagement means respectively, for locking the access door in place in the filter module unit. The preferred approach as shown in the figures is to provide an engagement aperture such as a simple rotrod hole 42 in a entrance lip 41 along one side of the support shelf 40, and a simple sliding barrel locking bar 70 for engaging the hole 42. Many other forms of mechanical locking devices may alternately be used in the latter application.

The preferred structure of the guide and end legs, as best seen in FIG. 4, is a double wall construction including a pair of parallel sides or walls 19 and 19', such that in cooperation with the opposing guide rails 18A and 18B, these elements form a closed box construction defining an enclosed space 80 within the box construction, the enclosed space 80 being accessible through access holes 81 for driving mounting screws 82 for mounting the filter module unit 10 to a furnace 83.

In use the module unit 10 is typically fastened to the underside of a furnace 83 or air conditioner whereby air flow is upward. The access door 30 is removed from the unit 10. The filter handle 60 is inserted into the filter element 20 and the element 20 is slid into the module unit 10 until the element side edge 24B is brought into contact with sides 19. A guide fixture 100 may be placed on side 19 to help guide the filter element 20 into place and to hold the element 20 during use. The access door is then returned to its place between the two guide rails 18A and 18B. The first sloping surface 31 of the access door 30 slides on the sloping surface 61 of the handle 60 providing a wedging action as the access door 30 is pushed onto the module. A second sloping surface 32 of access door 30 is brought into contact with the filter element 20 thereby forcing it downward and to the rear of the module. This, along with the guide fixture 100 causes the filter element to be held tightly against the module and fixed at a designated location desired for optimum performance. With the access door 30 in place bolt 70 is closed to lock the filter element 20 in place. Because the filter module unit is relatively thin, several of such units may be stacked on top of the next to achieve multiple filter configurations. Such a configuration may include a standard pleated micro-filter for capturing particulate such as dusts and pollen down to about 5 micron in size, followed by a charcoal filter for extracting fumes and odors from the air stream, and may include an electrostatic precipitator or other unit for capturing essentially all particles of any size down to large individual airborne molecules. A wide variety of fastening solutions can be applied to mounting the modules individually or in stacks. Sheet metal screws are commonly used and apply to the instant invention as well as shown in the figures. A toggle or winged fastener is of particular applicability in that the double wall construction of the U-shaped frame provides a unique passage for the installation of fasteners from below into mounting holes in the lower sheet metal portions of the air handler without disturbing the spaces for air flow and filter movement.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A combination of a filter module unit and a replaceable filter element for a air handling system, the combination comprising.

the filter module unit having a three sided U-shaped outer frame of channel construction for slidably accepting the filter element within the frame, and a removable access door adapted for positive engagement with the frame for forming a forth side on the frame to enclose the filter element within the frame;

the filter element being of flat rectangular construction including a filter element frame supporting in peripheral engagement, a filter media, the filter element frame being adapted to tightly fit within the outer frame in such manner as to prevent a directed air stream from diverting around the filter element;

the U-shaped outer frame comprising a pair of parallel guide legs interconnected by a base leg, each of the legs being three sided in cross section having opposing guide rails integral with an end rail side, the filter element having a mounting surface disposed between four side edges, the edges defining a rectangular peripheral extent of the filter element, the mounting surface adapted to contact three of the opposing guide rails, while two of the four side edges of the filter element are adapted for close fitting, each adjacent to a corresponding end rail side of one of the guide legs such that the filter element is guided between the end rail sides into place against the three of the opposing guide rails, the pair of parallel guide legs being further joined, adjacent to the access door by a support shelf extending between the pair of guide legs and providing a forth surface mainly coplanar with the three of the opposing guide rails to form an open window for exposing the filter media to the directed air stream.

2. The combination of claim 1 further including a filter element handle providing means for engaging the filter element for inserting and for withdrawing the element from the outer frame, and means for manual engagement of the handle for manipulation thereof.

3. The combination of claim 2 wherein the handle extends in engaged contact with the filter element at one end thereof via the means for engaging, and therefrom toward the position of the access door, providing a sloping surface thereon.

4. The combination of claim 3 wherein the access door provides a corresponding first sloping surface for riding in contact with the sloping surface of the handle and a second sloping surface for pressing against the filter element in wedged engagement therewith to ensure that the filter element is fully engaged within the filter module unit.

5. The combination of claim 4 wherein the filter module unit and the access door have first and second mutually cooperative locking engagement means respectively, for locking the access door in place in the filter module unit.

6. The combination of claim 1 wherein the guide rails each include a pair of parallel walls, the parallel walls in cooperation with the opposing guide rails to form a closed box construction defining an enclosed space within the box construction, the enclosed space being accessible through access holes for driving mounting screws for mounting the filter module unit.

* * * * *